United States Patent [19]
Kaiser et al.

[11] Patent Number: 5,315,247
[45] Date of Patent: May 24, 1994

[54] METHOD AND APPARATUS FOR MEASURING A MAGNETIC FIELD USING A DEFLECTABLE ENERGIZED LOOP AND A TUNNELING TIP

[75] Inventors: William J. Kaiser, West Covina, Calif.; Steven B. Waltman, Boulder, Colo.; Thomas W. Kenny, Glendale, Calif.

[73] Assignee: California Institute of Technology, Pasadena, Calif.

[21] Appl. No.: 996,613

[22] Filed: Dec. 24, 1992

Related U.S. Application Data

[60] Division of Ser. No. 685,553, Apr. 15, 1991, which is a continuation-in-part of Ser. No. 118,733, Nov. 9, 1987, abandoned.

[51] Int. Cl.⁵ .......................................... G01R 33/02
[52] U.S. Cl. .................................. 324/244; 324/260
[58] Field of Search .............. 324/244, 256, 257, 258, 324/260, 261

[56] References Cited

U.S. PATENT DOCUMENTS

| | | | |
|---|---|---|---|
| 3,545,090 | 12/1970 | Anthony | 73/178 R |
| 3,564,890 | 2/1971 | Catapano | 73/178 R |
| 4,445,376 | 5/1984 | Merhav | 73/510 |
| 4,618,767 | 10/1986 | Smith et al. | 250/311 |
| 4,638,669 | 1/1987 | Chou | 73/517 R |
| 4,724,318 | 2/1988 | Binnig | 250/306 |
| 4,823,004 | 4/1989 | Kaiser et al. | 250/306 |
| 4,861,990 | 8/1989 | Coley | 250/306 |

OTHER PUBLICATIONS

Russell Young, John Ward, and Fredric Scire, The Topografiner: *An Instrument for Measuring Surface Microtopography* Rev. Sci. Instrum., 1972, 43, 999 (no month).

G. Binnig, H. Rohrer, Ch. Gerber, and E. Weibel, *Tunneling Through A Controllable Vacuum Gap*, Appl. Phys. Lett., 1982, 40, 178 (no month).

Drs. G. Binnig, C. F. Quate and Ch. Gerber, *Atomic Force Microscope*, Phys. Rev. Lett., 1986, 56, 930 (no month).

G. Binnig, H. Rohrer, Ch. Gerber and E. Weibel, *Surface Studies by Scanning Tunneling Microscopy*, Phys. Rev. Lett., 1982, 49, 57, of IBM Zurich Research Laboratory (no month).

U. Dürig, J. K. Gimzewski and D. W. Phol, *Experimental Observation of Forces Acting During Scanning Tunneling Microscopy*, Phy. Rev. Lett., 1986, 57, 2403 (no month).

Gary M. McClelland, Ragnar Erlandsson and Shirley Chiang, *Atomic Force Microscopy: General Principles and a New Implementation*, accepted for publication in Review of Progress in Quantitative Non–Destructive Evaluation, vol. 6, Plenum, N.Y., (1987) (no month).

Ch. Gerber, B. Binnig, H. Fuchs, O. Marti and H. Rohrer, *Scanning Tunneling Microscope Combined With a Scanning Electron Microscope*, Rec. Sci. Instrum., 1986, 57, 221 (no month).

(List continued on next page.)

*Primary Examiner*—Walter E. Snow
*Attorney, Agent, or Firm*—Benoit Law Corporation

[57] ABSTRACT

Methods and apparatus for measuring gravitational and inertial forces, magnetic fields, or wave or radiant energy acting on an object or fluid in space provide an electric tunneling current through a gap between an electrode and that object or fluid in space and vary that gap with any selected one of such forces, magnetic fields, or wave or radiant energy acting on that object or fluid. These methods and apparatus sense a corresponding variation in an electric property of that gap and determine the latter force, magnetic fields, or wave or radiant energy in response to that corresponding variation, and thereby sense or measure such parameters as acceleration, position, particle mass, velocity, magnetic field strength, presence or direction, or wave or radiant energy intensity, presence or direction.

12 Claims, 6 Drawing Sheets

OTHER PUBLICATIONS

G. Binnig and H. Rohrer, *Scanning tunneling microscopy*, Helvetica Physica Acta, vol. 55 (1982) 726–735 (no month).

Calvin F. Quate, *Vacuum tunneling: A new technique for microscopy*, Phys. Today (Aug. 1986) 26–33.

K. E. Petersen, A. Shartel, and N. F. Raley, *Micromechanical Accelerometer Integrated with MOS Detection Circuitry*, IEEE Trans. Electron Devices, ED–29, 23 (1982) (no month).

K. E. Petersen, *Dynamic Micromechanics on Silicon: Techniques and Devices*, IEEE Trans. Electron Devices, ED–25, 1241 (1978) (no month).

T. G. Reynolds III and D. M. Tanka, *Consider Piezoelectric Ceramics*, Electronic Design 19, pp. 92 to 97 (Sep. 1977).

G. Binnig and H. Rohrer, Scanning Tunneling Microscopy, IBM J. Res. Develop. 30, 355 (1986) (no month).

F. Rudolf, Silicon Microaccelerometer, Sensors and Actuators 4, 191 (1983) (no month).

C. S. Sander et al., A Monolithic Capacitive Pressure Sensor with Pulse–Period Output, IEEE Trans. Electron Devices ED–27,927 (1980).

K. E. Petersen, Silicon as a Mechanical Material, Proc. IEEE 70, 420 (1982) (no month).

M. J. S. Smith et al., Analysis, Design, and Performance of a Capacitive Pressure Sensor IC, IEEE Trans. Biomed. Eng. BME–33, 163 (1986) (no month).

M. E. Welland et al., Spatial location of electron trapping defects on silicon by scanning tunneling microscopy, Appl. Phys. Lett. 48, 724 (1986) (no month).

J. B. Pendry et al., Electrons at Disordered Surfaces and 1/f Noise, Phys. Lett. Rev. Lett. 57, 2983 (1986) (no month).

D. L. Gardner et al., A Fiber-Optic Interferometric Seismometer, J. Lightwave Tech. LT–5, 953 (1987) (no month).

D. Rugar, Force microscope using a fiber-optic displacement sensor, Rev. Sci. Instrum. 59, 11 (1988) (no month).

A. A. Baski et al., Tunneling acclerometer, J. of Microscopy 152, 73 (1988) (no month).

M. F. Bocko et al., Vacuum Tunneling Probe: A Nonreciprocal, Reduced-Back-Action Transducer, Phys. Rev. Lett. 61, 726 (1988) (no month).

D. W. Abraham et al., Noise reduction technique for scanning tunneling microscopy, Appl. Phys. Lett. 53, 1503 (1988) (no month).

J. H. Wandass et al., Magnetic Field Sensing With Magnetostrictive Materials Using A Tunneling Tip Detector, Sensors and Actuators 19, 211 (1989) (no month).

D. W. De Bruin et al., Second-order Effects in Self-testable Accelerometers, Sensors and Actuators, 20, 153 (1989) (no month).

R. A. Brizzolara et al., A Tunneling-tip Magnetometer, Sensors and Actuators 20, 199 (1989) (no month).

S. Akamine et al., Microfabricated Scanning Tunneling Microscope, IEEE Electron Device Lett. 10, 490 (1989) (no month).

E. Stemme and G. Stemme, A Balanced Dual-Diaphragm Resonant Pressure Sensor in Silicon, IEEE Trans. Elect. Dev. 37, 648 (1990) (no month).

R. B. Marcus et al., Formation of silicon tips with >1nm radius, Appl. Phys. Lett. 56, 236 (1990) (no month).

B. Yurke et al., Momentum noise in vacuum tunneling transducers, Phys. Rev. B 41, 8184 (1990) (no month).

M. J. E. Golay, Theoretical Consideration in Heat and Infra-Red Detection, with Particular Reference to the Pneumatic Detector, Rev. Sci. Inst. 18, 347 (1947) (no month).

M. J. E. Golay, A Pneumatic Infra-Red Detector, Rev. Sci. Inst. 18, 357 (1947) (no month).

M. J. E. Golay, The Theoretical and Practical Sensitivity of the Pneumatic Infra-Red Detector, Rev. Sci. Inst. 20, 816 (1949) (no month).

L. N. Hadley et al., Reflection and Transmission Interference Filters, J. Opt. Sci. Am. 37, 451 (1947) (no month).

C. Hilsum, Infrared Absorption of Thin Metal Films, J. Opt. Sci. Am. 44, 188 (1954) (no month).

A. Hadni, Essentials of Modern Physics Applied to the Study of the Infrared (Pergamon, Oxford, 1967) pp. 269–283 (no month).

R. A. Smith et al., The Detection and Measurement of Infra-Red Radiation, 175 (Oxford 1968), (no month).

E. H. Putley, Thermal Detectors, in Optical and Infrared Detectors, ed R. J. Keyes (Springer, Berlin, 1977) pp. 71–98 (no month).

T. G. Blaney, Radiation detection at submillimetre wavelengths, 856 (Institute of Physics, 1978) (no month).

OTHER PUBLICATIONS

F. Sibille, Infrared detection and imaging, Re. Prog. Phys 49, 1197 (1986) (no month).

W. L. Wolfe, The Infrared Handbook, 11-1 (IRIA Michigan, 1989) (no month).

N. S. Nishioka et al., Composite bolometers for submillimeter wavelengths, Appl. Optics 17, 1562 (1978) (no month).

J. Kinoshita, Sons of STM, Scientific American, 25 (Jul. 1988).

S. B. Waltman and W. J. Kaiser, An Electron Tunneling Sensor, Sensors and Actuators, 19 (1989) 201–210 (no month).

T. W. Kenny, S. B. Waltman, J. K. Reynolds, and W. J. Kaiser, A novel electron tunneling infrared detector, Proceedings Innovative Long Wavelength Infrared Detector Workshop, 197–207 (Apr. 1990).

T. W. Kenny, S. B. Waltman, J. K. Reynolds, and W. J. Kaiser, Micromachined silicon tunnel sensor for motion detection, Appl. Phys. Lett. 58, 100 (1991) (no month).

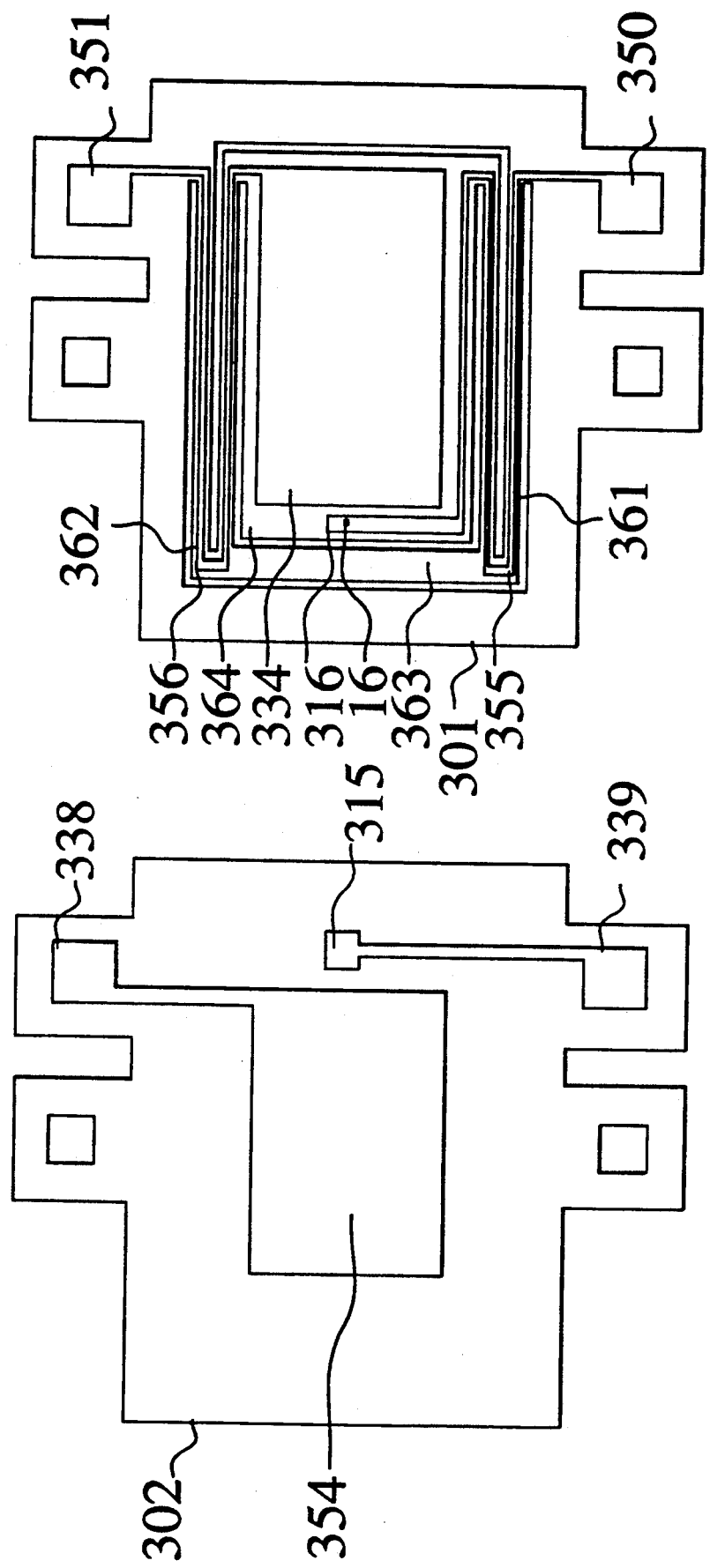

METHOD AND APPARATUS FOR MEASURING A MAGNETIC FIELD USING A DEFLECTABLE ENERGIZED LOOP AND A TUNNELING TIP

CROSS REFERENCE

This is a division of application Ser. No. 07/685,553, filed Apr. 15, 1991 as a continuation-in-part of application Ser. No. 07/118,733, filed Nov. 9, 1987 for Tunnel Effect Measuring Systems and Particle Detectors, now abandoned, assigned to the common assignee and herewith incorporated by reference herein.

DESCRIPTION

The invention described herein was made in the performance of work under a NASA contract, and is subject to the provisions of Public Law 96-517 (35 USC 202) in which the Contractor has elected to retain title.

BACKGROUND OF THE INVENTION

The present invention relates to sensors, measuring systems, particle detectors, and to new uses of tunnel effect systems and devices and to physical manifestations of such new uses, and, more specifically, to methods and apparatus for measuring gravitational and inertial forces, including accelerometers, position sensors, particle detectors, acoustic wave detectors, microphones, and the like.

INFORMATION DISCLOSURE STATEMENT

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

For several decades electron tunneling devices have been used as signal detectors for electromagnetic radiation, as microwave signal sources, and as digital switching elements. Historically, electron tunneling appeared only in devices where a thin tunnel "barrier" insulator was trapped between two conducting electrodes.

The barrier thickness in tunnel devices is 1–10 atomic diameters. Tunnel devices, therefore, have been limited in application due to the difficulty of preparing reliable, thin tunnel barriers.

The invention of the Scanning Tunneling Microscope (STM) has enabled electron tunneling between two conductors separated only by vacuum, gas, or liquid. The STM technology breakthrough allows the separation of tunnel electrodes to be held constant under electromechanical control at 5–10 Å with a tolerance of $10^{-2}$–$10^{-4}$ Å.

However, the subject invention should be distinguished from Scanning Tunneling Microscopy (STM), even though embodiments thereof may in part use similar instrumentation. STM sprang from efforts to characterize the topography of surfaces at the atomic level, manifesting themselves initially in the so-called "topografiner" developed by Russell Young, John Ward and Fredric Scire, as apparent from their article entitled *The Topografiner: An Instrument for Measuring Surface Microtopography*, Rev. Sci. Instrum., 1972, 43, 999. The topografiner produced real space images of irregular surfaces. Since the topografiner achieved lateral resolutions on the order of 4000 Å and surface normal resolutions of 30–40 Å, it was a notable development of the past six years when Binnig et al. overcame various stability problems and demonstrated the first scanning tunneling microscope which achieved lateral resolutions on the order of tens of angstroms, with angstrom resolution normal to the surface. Early STM designs went to great lengths to achieve tunneling gap stability. As apparent from their article entitled *Tunneling Through A Controllable Vacuum Gap*, G. Binnig, H. Rohrer, Ch. Gerber, and E. Weibel, Appl. Phys. Lett., 1982 40, 178, demonstrated tunneling from a W tip to a Pt surface with an STM in a vacuum chamber on a stone bench "floating" on inflated rubber tubes.

Internal vibrations were filtered out by magnetic levitation over a superconducting bowl of Pb which was superinsulated and cooled directly by liquid He. Subsequently, tunneling current has been demonstrated with less elaborate STM units. The key is structural rigidity of the tip-sample connection which forces any external vibrations to move tip and sample identically and simultaneously. There now are STM's with lateral resolutions of less than 5 Å and normal resolutions of hundredths of angstroms.

In an article entitled *Atomic Force Microscope*, Phys. Rev. Lett., 1986, 56, 930, Drs. G. Binnig, C. F. Quate and Ch. Gerber proposed measurement of ultrasmall forces on particles as small as single atoms by monitoring the elastic deformation of various types of springs with their scanning tunneling microscope. By way of background, they pointed out that it has been a common practice to use the displacement of springs as a measure of force, and that previous methods have relied on electrostatic fields, magnetostatic fields, optical waves, and x-rays. They also commented that SQUIDs are superconducting elements that measure the expulsion of magnetic fields in variable-inductance devices, and that have been used in gravity gradiometers to measure displacements of $10^{-6}$ Å. Others in their work with van der Waals forces have used optical interference methods to measure displacements of 1 Å. Their effort similarly was concerned with penetrating the regime of interatomic forces between single atoms and they proposed their atomic force microscope (AFM) as a new tool designed to exploit that level of sensitivity, enabling investigation of both conductors and insulators on an atomic scale. They envisioned a general-purpose device that will measure any type of force; not only the interatomic forces, but electromagnetic forces as well. However, the atomic force microscope actually disclosed in that article is a combination of the principles of the scanning tunneling microscope and the stylus profilometer.

In their proposed first mode, they modulated the sample in the z-direction at its resonant frequency (5.8 kHz). The force between the sample and the diamond stylus—the small force that they want to measure—deflects the lever holding the stylus. In turn, this modulates the tunneling current which is used to control the AFM-feedback circuit and maintain the force $f_o$ at a constant level.

In their second and third modes, the lever carrying the diamond stylus is driven at its resonant frequency in the z-direction with an amplitude of 0.1 to 10 Å. The force, $f_o$, between sample and stylus changes the resonant frequency of the lever. This changes both the amplitude and phase of the ac modulation of the tunneling current. Either of these can be used as a signal to drive the feedback circuits.

In the fourth mode they used one feedback circuit. It was connected to the AFM and it was controlled by the tunneling current in the STM. This system maintained the tunneling gap at a constant level by changing the force on the stylus.

The fourth mode was further improved by reconnection of both feedback circuits in such a way that the AFM sample and the STM tip were driven in opposite directions with a factor $\alpha$ less in amplitude for the STM tip. The value of $\alpha$ ranged from 10 to 1000.

In contrast to previous methods, the absolute value of $f_o$, the force on the stylus, was not well defined except at the beginning of the measurement, even in the absence of thermal drifts. However, they saw the limiting sensitivity of their instrument as far less than interatomic forces ranging from ionic bonds to van der Waals bonds and down to perhaps $10^{-12}$ N for some of the weaker forces of surface reconstruction. Their AFM, therefore, should be able to measure all of the important forces that exist between the sample and adatoms on the stylus.

They further pointed out that these forces also exist in the tunneling microscope itself and that they can have a strong influence on the data collected with the STM. Accordingly, they mentioned that the STM could be used as a force microscope in the mode they described by simply mounting the STM tip on a cantilever beam.

Further background materials include another article by G. Binnig, H. Rohrer, Ch. Gerber and E. Weibel, of the IBM Zurich Research Laboratory, entitled *Surface Studies By Scanning Tunneling Microscopy*, Phys. Rev. Lett., 1982, 49, 57, an article by U. Dürig, J. K. Gimzewski and D. W. Phol, entitled *Experimental Observation of Forces Acting During Scanning Tunneling Microscopy*, Phys. Rev. Lett., 1986, 57, 2403, and another article on atomic force microscopy by Gary M. McClelland, Ragnar Erlandsson and Shirley Chiang, entitled *Atomic Force Microscopy: General Principles and a New Implementation*, accepted for publication in Review of Progress in Quantitative Non-Destructive Evaluation, Vol. 6, Plenum, N.Y. (1987).

An interesting design is apparent from an article by Ch. Gerber, G. Binnig, H. Fuchs, O. Marti and H. Rohrer, entitled *Scanning Tunneling Microscope Combined With a Scanning Electron Microscope*, Rev. Sci. Instrum., 1986, 57, 221, disclosing their "Pocket-Size" STM needing very little external vibration isolation.

Scanning tunneling microscopy also has been described in an article thus entitled by G. Binnig and H. Rohrer, published in Helvetica Physica Acta, Vol. 55 (1982) 726–735. The atomic force microscope and method for imaging surfaces with atomic resolution is described in Dr. Binnig's U.S. Pat. No. 4,724,318, issued Feb. 9, 1988. A low-energy scanning transmission electron microscope is disclosed in U.S. Pat. No. 4,618,767, by David A. Smith and Oliver C. Wells, and issued Oct. 21, 1986. Tunnel and field effect carrier ballistic systems are disclosed in U.S. Pat. No. 4,823,004, by William J. Kaiser and Douglas Bell, and issued Apr. 18, 1989.

In 1986, Drs. Binnig and Rohrer received the Nobel Prize in Physics for their above mentioned work.

An overview has been published by Calvin F. Quate under the title of *Vacuum tunneling: A new technique for microscopy*, PHYS. TODAY (Aug. 1986) 26–33, mentioning inter alia topography, surface state studies, surface charge density measurements, catalytic reaction studies, and material deposition as present or prospective fields of application.

Despite those developments the need for an advanced sensor technology with high resolution and bandwidth continued to grow for applications in navigation, control, pointing, tracking and testing of space and defense systems. The constraints of mass, volume, power and cost are prime concerns in nearly all applications.

Sensors now in use for detection of acceleration, force, torque, strain, pressure, and other signals, rely on the electronic measurement of the displacement of sensor components in electrostatic, electromagnetic and piezoelectric devices. For example, acceleration is measured by monitoring the displacement of a spring-supported "proof mass" under acceleration of the sensor structure. The detection of displacement is typically by measurement of a variation in capacitance or inductance resulting from motion of the pendulum or cantilever. The need for high sensitivity in typical applications requires the use of large proof mass, bulky position detection components and high power consumption electronics.

By way of comparison, reference may be had to an article by K. E. Petersen, A. Shartel, and N. F. Raley, entitled *Micromechanical Accelerometer Integrated with MOS Detection Circuitry*, IEEE Trans. Electron Devices, ED-29, 23 (1982), describing a micro-accelerometer based on capacitive-position detection using a cantilever-supported proof mass having a deflection sensitivity of 680 Angstroms per g of acceleration. The capacitive signal of that device changed by only 0.5 percent for a 1 g change in acceleration.

In contrast, an improvement of orders of magnitude in sensitivity is required to provide the kind of system sensitivity, system bandwidth and/or reduction in sensor volume increasingly needed in advanced applications.

Preferably, any advance in sensor technology should be compatible with the capabilities of existing Si micromachining techniques. Reference may in this respect be had to articles by K. E. Petersen, entitled *Dynamic Micromechanics on Silicon: Techniques and Devices*, IEEE Trans. Electron Devices, ED-25, 1241 (1978), and *Silicon as a Mechanical Material*, Proceedings of the IEEE, Vol. 70 (May 1982) 420, describing production of components from single-crystal silicon, and to an article by F. Rudolf, A. Jornod and Philip Bencze, entitled *Silicon Microaccelerometer*, 395, describing manufacture of a capacitive servoaccelerometer, employing a force balancing loop in a linearizing circuit.

Apparatus and method for measuring specific force and angular rate are disclosed in U.S. Pat. No. 4,445,376, by S. J. Merhav, issued May 1, 1984.

Tunneling Susceptometry has been disclosed in U.S. Pat. No. 4,861,990, by T. R. Coley, issued Aug. 29, 1989, and describing use of tunneling phenomena in determining susceptability of material samples to magnetic, electrostatic or other fields.

The difficulty of work in this area is illustrated by U.S. Pat. No. 4,638,669, by Stephen Y. Chou, issued Jan. 27, 1987 for a so-called "Quantum Tunneling Cantilever Accelerometer." While that accelerometer was capable of providing an output potentially superior to outputs of prior-art capacitive accelerometers, it was discovered in 1989 that Dr. Chou's accelerometer is in fact an improved capacitive accelerometer in which no discernible electron tunneling can take place. Accordingly, Dr. Chou used a pulse generator for energization, and avoided the need for a feedback loop or servo system by isolating his electrode.

SUMMARY OF THE INVENITON

It is a general object of this invention to overcome the disadvantages and to meet the needs expressed or implicit in the above Information Disclosure Statement or in other parts hereof.

It is a germane object of this invention to provide improved sensors and measuring systems.

It is also an object of this invention to provide new applications and utility for electron tunneling.

It is a related object of this invention to provide a new class of microsensors using electron tunneling position or force detection.

It is also a related object of this invention to provide new methods and apparatus for measuring gravitational and inertial forces.

It is also a related object of this invention to provide new position sensors and position sensing methods.

It is also a related object of this invention to provide new particle detectors and particle detecting methods.

It is also a related object of this invention to provide new acoustic wave detectors and detecting methods.

It is also a related object of this invention to provide new hypersensitive microphones.

It is also a related object of this invention to provide new infrared and other radiation detecting methods and apparatus.

It is also a related object of this invention to provide new magnetometer and similar apparatus.

It is also an object of this invention to provide new uses for basically known or obvious devices or apparatus.

Other objects will become apparent in the further course of this disclosure.

The invention resides in methods and apparatus for determining a position of an object in space, comprising in combination the steps of or means for providing an electric tunneling current through a tunneling gap between an electrode and the object in space, determining a position of that object in space when providing the electric tunneling current through a tunneling gap between an electrode and that object in space, varying the gap with a gravitational force acting on the object by changing that object in position to induce a corresponding variation in an electrical property of the gap relating to the tunneling current, and determining the direction of the gravitational force relative to the object from that corresponding variation in that electrical property and thereby the changed position of the object in space.

The invention resides also in methods and apparatus for determining a position of an object in space, comprising in combination a constant voltage or constant current source, and the steps of or means for deriving from that constant voltage or current source an electric tunneling current through a tunneling gap between an electrode and the object in space, determining a first position of that object in space from an electrical property of that gap relating to the tunneling current, changing the object in position to induce a variation in the gap and in the electrical property, determining a change in voltage caused by flow of current from the source to the gap in response to that gap variation, and determining the changed position of the object from that change in voltage.

The invention resides also in methods of measuring a force acting on an object, comprising in combination the steps of providing an elastic beam for suspending that object, making that elastic beam deflectable by an electrostatic feedback signal, providing a tunneling gap between a tunneling tip and an electrode, connecting one of that tunneling tip and that electrode to the elastic beam, providing an electric tunneling current through the tunneling gap between the tunneling tip and the electrode, deflecting the elastic beam with said force to provide a variation in an electrical property of the gap relating to the tunneling current, providing a servo loop responding to that variation in that electrical property, deriving the electrostatic feedback signal from the servo loop, restoring the deflected beam in position with the derived electrostatic feedback signal, and providing a servo loop output signal indicative of said force.

The invention resides also in apparatus for measuring a force acting on an object comprising in combination, an elastic beam suspending that object, means for deflecting that elastic beam with an electrostatic feedback signal, a tunneling tip, an electrode, and a tunneling gap between that tunneling tip and that electrode, one of that tunneling tip and that electrode connected to the elastic beam, means for providing an electric tunneling current through the tunneling gap between the tunneling tip and and the electrode, means for deflecting the elastic beam with said force to provide a variation in an electrical property of the gap relating to the tunneling current, means including a servo loop responding to that variation in the electrical property, means for deriving the electrostatic feedback signal from the servo loop, means connected to the means for deriving the electrostatic feedback signal and to the means for deflecting the elastic beam, for restoring that deflected beam in position with that derived electrostatic feedback signal, and means connected to the servo loop for providing a servo loop signal indicative of said force.

The invention resides also in methods and apparatus for measuring a magnetic field, comprising in combination an electrically energizable loop and the steps of or means for making that electrically energizable loop deflectable by the magnetic field when electrically energized, providing a tunneling gap between a tunneling tip and an electrode, connecting one of that tunneling tip and that electrode to the loop, electrically energizing that loop, providing an electric tunneling current through the tunneling gap between the tunneling tip and the electrode, deflecting the electrically energized loop with the magnetic field to provide a variation in an electrical property of the gap relating to the tunneling current, and providing a measurement of the magnetic field in response to that variation in the electrical property.

The invention resides also in methods and apparatus for measuring gravitational and inertial forces acting on an object in space, comprising in combination a constant voltage or a constant current source, and the steps of or means for providing an electric tunneling current through a gap between an electrode and the object in space with current from the constant voltage or current source, varying the gap with any one of the forces acting on the object, determining a change in voltage caused by current from the source in response to that gap variation, and deriving a measurement of the force from the change in voltage.

The invention resides also in methods and apparatus for measuring gravitational and inertial forces acting on an object in space, comprising in combination the steps of or means for providing an electric tunneling current through a gap between an electrode and the object in space, varying that gap with any of the forces acting on the object and sensing a corresponding variation in an electrical property of that gap, restoring that varied gap with an electric signal in response to that variation in that electrical property, and deriving a measurement of the force from that electric signal.

The invention resides also in methods and apparatus for measuring inertial forces acting on an object in space, comprising in combination the steps of or means for providing an electric tunneling current through a gap between an electrode and the object in space, impacting wave energy on that object, varying the gap with inertial forces acting on that object from the impacting wave energy and sensing corresponding variations in an electrical property of the gap, and determining the inertial forces for detection of the wave energy from the corresponding variations in the electrical property.

The invention resides also in methods of detecting radiation capable of varying a fluid volume, comprising in combination the steps of entrapping that fluid volume, providing a first electrode in force-transfer relationship with the entrapped fluid volume, providing a second electrode spaced from that first electrode, providing one of these first and second electrodes with a tunneling tip spaced by a tunneling gap from the other of these first and second electrodes, providing an electric tunneling current through that tunneling gap, varying the entrapped fluid volume with the radiation to displace the first electrode and sensing a corresponding variation in an electrical property of the gap relating to the tunneling current, and determining a parameter of the radiation from that variation in that electrical property.

The invention resides also in apparatus for detecting radiation capable of varying a fluid volume, comprising in combination, an entrapped fluid volume, a first electrode in force-transfer relationship with that entrapped fluid volume, a second electrode spaced from that first electrode, a tunneling tip on one of these first and second electrodes spaced by a tunneling gap from the other of these first and second electrodes, means for providing an electric tunneling current through that tunneling gap, means for impacting the radiation on the fluid volume for varying that entrapped fluid volume with that radiation to displace the first electrode, and sensing a corresponding variation in an electrical property of the gap relating to the tunneling current, and means for determining a parameter of that radiation from that variation in that electrical property.

According to a preferred embodiment of the invention applicable to all of these method and apparatus aspects, the varied gap is restored with an electrical signal, or with another predetermined agency, in response to variation of a predetermined electrical property of that gap, and a measurement or determination of the force or changed position is derived from that electric signal or from whatever quantity of another agency is required for restoring the gap to a quiescent value.

Other aspect of the invention will become apparent in the further course of this disclosure, and no restriction to any object or aspect is intended by this Summary of the Invention.

Unlike the above mentioned prior efforts, the subject invention does not deal with interatomic and intermolecular forces. Rather, the subject invention and its embodiment determine or measure forces on any object in space, meaning outer space for one thing or at least environments outside any interatomic or intermolecular region.

BRIEF DESCRIPTION OF THE DRAWINGS

The invention and its various objects and aspects will become more readily apparent from the following detailed description of preferred embodiments thereof, illustrated by way of example in the accompanying drawings, in which like reference numerals designate like or equivalent parts, and in which:

FIG. 3 is a view taken on the line 3—3 in FIG. 5;

FIG. 4 is a view on a reduced scale taken on the line 4—4 in FIG. 5, but turned about the left-hand edge;

Figure 6:
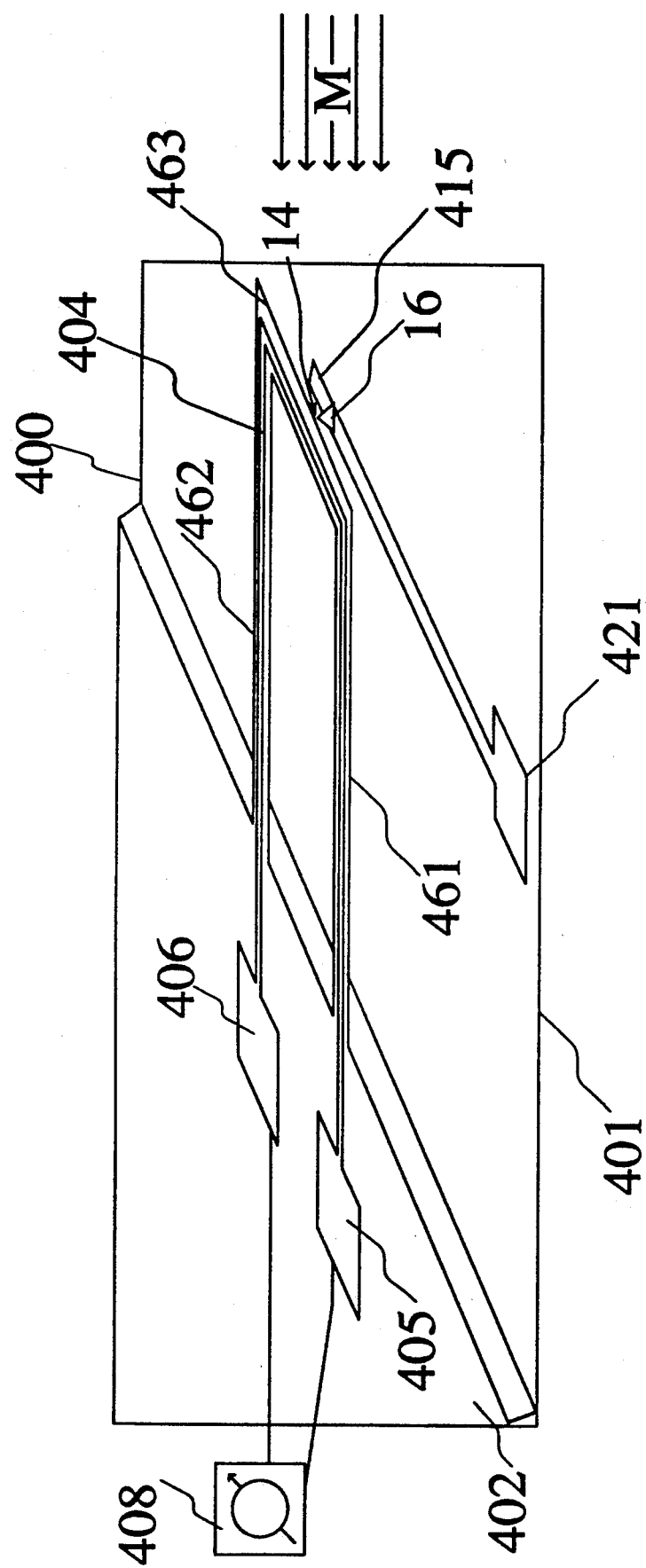
FIG. 6 is a somewhat diagrammatic perspective view of a tunneling magnetometer pursuant to an embodiment of the invention.

It may be noted that FIGS. 3, 4 and 6 use slanted lines for contrast and better understanding, rather than for showing any sections.

DESCRIPTION OF PREFERRED EMBODIMENTS

The drawing illustrates methods and apparatus 10 for measuring forces acting on an object 12. That method and apparatus provides an electric tunneling current 13 through a gap 14 between an electrode 15 and the object 12. In the illustrated embodiment of the invention, this is done by providing first and second electrodes 15 and 16 at opposite sides of the gap 14 and by coupling the second electrode to the object 12 for movement therewith, while maintaining the first electrode relatively stationary on a support or mounting structure, part of which is seen at 18 in the drawing. However, the phrase "a gap between an electrode and the object," as repeatedly used herein, should be broadly construed within the scope of the subject invention.

In the operation of the illustrated method and apparatus, the gap 14 is varied with a force, F, acting on the object 12, and a corresponding variation in the tunneling current is sensed.

The applied force, F, or its magnitude may then be determined in response to variations in the tunneling current 13. By way of example and not by way of limitation, such determination or measurement may be effected in the context of a constant voltage source or a constant current source. If a constant voltage source is employed, then a measurement of the applied force, F, may be derived from a change in current flowing to the electrode 15 or gap 14. On the other hand, in the case of a constant current source, variations in a voltage drop would be indicative of tunneling gap variations and applied forces.

Figure 1:
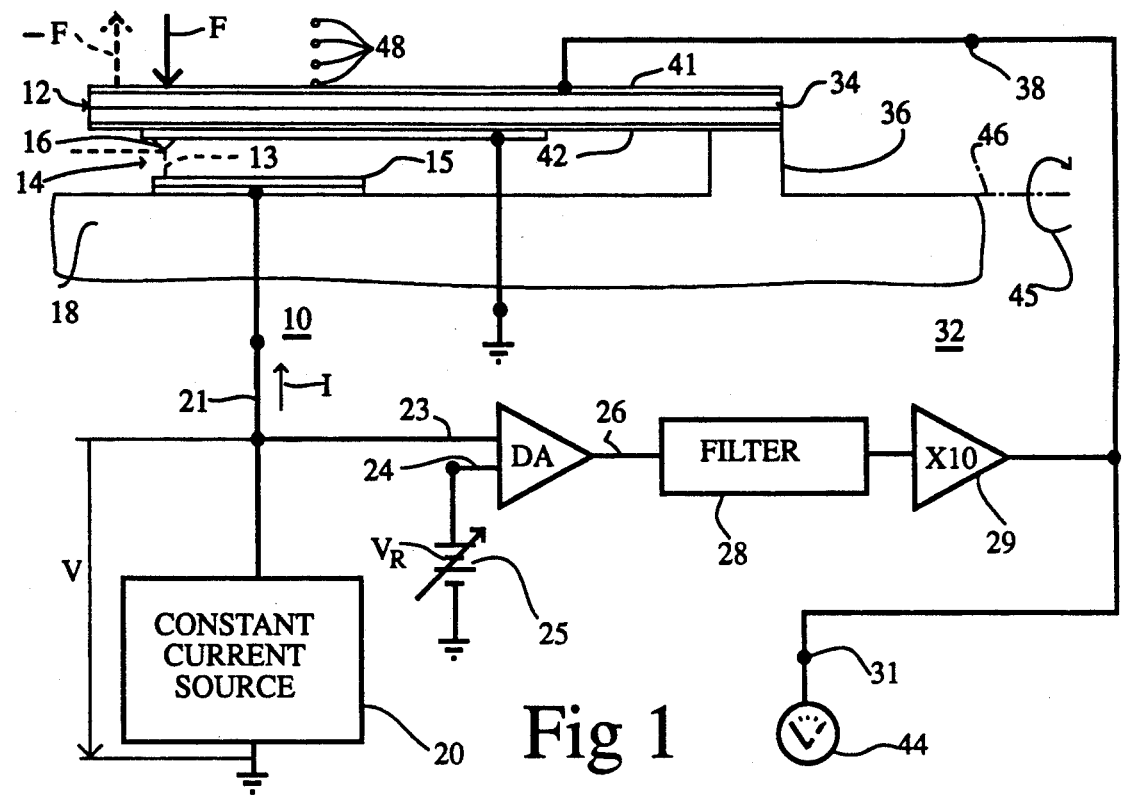
FIG. 1 is a diagrammatic view of a sensor and measuring system according to a first embodiment of the invention.
Figure 2:
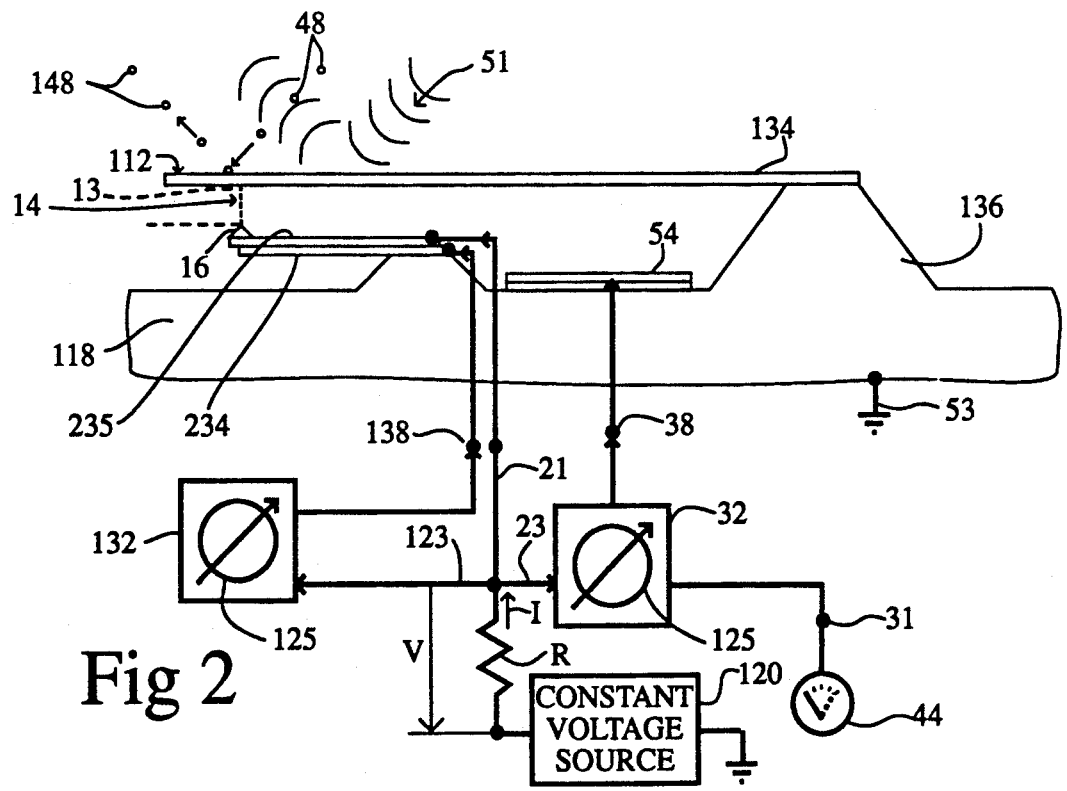
FIG. 2 is a view similar to the FIG. 1 showing modifications according to further embodiments of the invention.

The illustrated embodiments of the invention provide or employ a constant current source 20 in FIG. 1 and a constant voltage source in FIG. 2 for supplying the tunneling current 13, as illustrated by an arrow denoting the supply current, I. If the voltage is maintained constant, then the current, I, varies as the gap 14 is varied.

If the current, I, is maintained constant, then a voltage has to vary instead. In this respect, the illustrated embodiment of FIG. 2 connects a resistor R in series with the constant voltage source and the gap 14 or electrode 15. A voltage drop, v, occurs across that resistor R, when current, I, flows in the current supply lead 21 to the gap 14.

The illustrated embodiments observe a voltage, v, caused by current, I, from the source 20 or 120 when the gap 14 has a quiescent value; that is, for instance, when no force is applied. The illustrated apparatus or its equivalent then derives a measurement of such a force, F, from a change in that voltage.

By way of example, the embodiment of FIG. 1 employs a differential amplifier DA for observing the voltage, v, caused by current, I, from the source 20 when the gap 14 has a quiescent value. One input 23 of the differential amplifier is connected to the current supply lead 21 for that purpose, so as to receive an input signal corresponding to the value of the voltage, v. The other input 24 of the differential amplifier is connected to a source 25 of reference voltage, $V_R$. An arrow through the source 25 indicates that the reference voltage is adjustable. Adjustable voltage sources are already customary in tunneling devices where they are also used for offsetting electrode and tip Fermi levels.

By way of example, the reference voltage $V_R$ may be adjusted at the source 25 to be equal to the voltage, v, across the resistor R when the gap 14 has its quiescent value, and the differential amplifier DA may signify such quiescent value of the tunneling gap by a zero output signal at 26.

The illustrated embodiment of the invention may also be employed to sense a variation in the tunneling current or voltage across the gap or, generically, an electrical property of that gap 14, corresponding to a variation in the gap 14 by a force F. For instance, if the gap 14 is varied by a force F while the rate of flow, I, is maintained constant by the source 20, then there is a corresponding variation in the voltage drop across the gap 14 and a corresponding change in the voltage, v, across the current supply 20.

On the other hand, if the source is a constant voltage source as in FIG. 2, then there is a change in the rate of tunneling current flow as well, when the gap 14 is diminished by a force F.

These and other alternatives within the scope of the subject invention may be summarized by saying that an electrical property of the gap or its variation of that electrical property in response to a variation in that gap 14 is sensed and is employed to determine the force or other agency causing that gap variation.

The differential amplifier DA or functionally equivalent circuitry within the scope of the illustrated embodiment, in effect determines a change in voltage, v, caused by current, I, from the source 20 in response to the gap variation at 14, and derives a measurement of that force F from that change in that voltage, such as by comparing the value of that changed voltage to the reference voltage $V_R$. The resulting output signal of the differential amplifier is applied via output 26 to a filter 28 which may be employed for removing noise and undesired frequencies. The filter output may be further amplified by an amplifier 29 which applies its output signal to a terminal 31 as the output signal of the sensor or apparatus 10.

Variations of the tunneling gap 14 thus measured may be converted to a force indication on the basis of the elastic constant of the object suspension or beam 34. Alternatively, the apparatus 10 may be calibrated in terms of force.

Within the scope of the subject invention, a predetermined agency may be provided for restoring the gap 14 in response to variation of the tunneling current 13, and a quantity of that agency may be employed to a restoration of that gap. In that case, the force F or its value may be determined from that quantity. By way of example, if the varied gap 14 is restored with an electric current, voltage or signal in response to variation of a predetermined electrical property of the gap 14, then a measurement of the force F may be derived from that electric current, voltage or signal. Put otherwise, the tunneling gap 14 may be restored to its quiescent value in response to the above mentioned change in voltage, v, from which the value of the force, F, is also derived.

FIG. 1 also shows a practical embodiment for implementing these features within the scope of the subject invention. In particular, the drawing shows the differential amplifier DA, filter 28 and operational amplifier 29 arranged in a servo loop 32 which in effect includes the sensor itself to respond to each variation in an electrical property of the gap. The filter 28 thus may be a loop filter and the amplifier 29 may be a variable gain operational amplifier for increased stability, and/or may be a high-voltage amplifier for driving the beam 34.

The servo loop 32 also provides at the terminal 31 a servo loop output signal indicative of forces F varying the tunneling gap 14.

A preferred embodiment of the invention elastically suspends the object 12, and such elastically suspended object may be restored in position in response to variation of an electrical property of the gap 14. In this respect, the illustrated preferred embodiment integrates the object 12 with an elastic beam 34 which has a fixed end attached to a mesa 36 of the supporting structure 18 and carries the second electrode 16 as a tunneling tip at a free end thereof.

Of course, within the scope of the subject invention, the elastic beam 34 actually may carry a distinct object, such as a "proof mass," as found in accelerometers and the like. However, in the case of the illustrated embodiment of the invention, the object or "proof mass" is actually integrated with or constituted by the elastic beam 34 or, in effect, by a free end thereof at the tunneling tip 26.

Also within the scope of the illustrated preferred embodiment of the invention, the elastic beam 34 is made deflectable by a feedback signal. By way of preferred example, the elastic beam 34 is a piezoelectric bimorph deflectable by the feedback or loop signal proceeding through a terminal 38.

Piezoelectric bimorphs are old as such as may, for instance, be seen from an article by T. G. Reynolds III and D. M. Tanka, entitled *Consider Piezoelectric Ceramics*, ELECTRONIC DESIGN 19, pp. 92 to 97 (September 1977).

For present purposes, the bimorph may be considered as acting like a bimetallic strip responding to temperature variations, except that the bimorph beam 34 deflects in response to feedback or servo signals applied through the terminal 38 to a metallic or other electrically conductive coating 41 on one of the two piezoelectric strata of that elastic beam. The other stratum of the bimorph 34 is grounded by a second metallic or other electrically conductive coating 42. As indicated in the drawing, the tunneling tip 16 is also grounded, as is one of the terminals of the constant current source 20.

As apparent from the drawing, the feedback signal with which the elastic beam 34 is deflected, is derived from the servo loop 32 or is provided thereby. The beam 34, deflected by a force F, is thus restored in position with the derived feedback or servo loop signal via terminal 38. Put differently, the servo loop 32 restores the tunneling gap 14 to its quiescent value.

With the constant current source 20, the servo loop 32 responds to a change in the output voltage of the source in response to tunneling gap or electrical gap property variation, derives the requisite feedback signal with the servo loop from that change in voltage, and restores the tunneling gap 14 or restores the deflected beam 34 in position with that derived feedback or servo loop signal.

In the case of the illustrated embodiment and its variations within the scope of the subject invention, the servo loop 32 also provides a servo loop output signal indicative of the force F, such as at the output terminal 31.

A prototype of the sensor shown in the drawing had a sensitivity of 10–100 micro-g, a bandwidth of 2 kHz, and a dynamic range of 10 g as an accelerometer. The above mentioned state-of-the-art micromechanical accelerometer, based on capacitance detection, has an estimated sensitivity of only 1–10 milli-g, and a bandwidth of less than 2 kHz and equivalent dynamic range.

Achievable increase in sensor sensitivity by replacement of capacitance detection methods with tunneling methods may be directly calculated. As mentioned above, an existing micro-accelerometer based on capacitive-position detection uses a cantilever-supported proof mass having a deflection sensitivity of 680 Angstroms per g of acceleration. The capacitive signal of this device changes by only 0.5 percent for a 1 g change in acceleration. In contrast, a change of 0.5 percent in tunnel current corresponds to a deflection of the cantilever of $5 \times 10^{-13}$ Å and an acceleration of less than 10 micro-g. The tunnel sensor technology according to the subject invention, therefore, results immediately in an improvement of over five orders of magnitude in sensitivity. The improvement in sensitivity of the position detection mechanism may be used to provide additional system sensitivity or system bandwidth or reduction in sensor volume. Tunnel sensors for applications requiring ultra-high sensitivity may be tailored to provide nano-g sensitivity with proof masses in the 100 milligram range.

Tunnel sensor technology requirements are compatible with the capabilities of existing semiconductor or Si micro-machining techniques. Therefore, a tunnel sensor may be entirely fabricated from a monolithic Si structure. Micro-machined tunnel sensor elements may be incorporated into arrays to enable improvements in reliability. In addition, several tunnel sensor applications may benefit from the multipoint detection capabilities possible with array technology. Since tunnel sensor technology requires small tunnel currents, these devices may be very energy-efficient with operating power in the milliwatt range. In addition, since tunnel sensor operation depends only on the mechanical properties of the Si micromachined structure, Si-based tunnel sensors should be radiation-hard.

The tunneling gap or the entire integrated system may be positioned in a vacuum or inert atmosphere. The tunneling gap need not be void, but may be occupied by a material through which electron tunneling may take place and which is sufficiently pliant to cooperate with, or to form, the elastic suspension of the object 12 etc.

Electron tunneling between metallic electrodes depends on the overlap of electron states at each electrode surface or on overlap of the electrode work functions. Electron tunneling is observed only when electrode separation is less than a few atomic diameters. The extremely localized nature of the electron states results in a rapid exponential increase of electron tunnel current with decreasing electrode separation.

A film of high work function material, such as tungsten or a semiconductor, may be deposited on the electrodes, or the electrodes 15 and 16 may be made of such a material, in order to increase sensitivity by increasing exponential dropoff of tunneling current with tunneling gap increase.

The prototype of the illustrated tunnel effect sensor employs a piezoceramic actuator element 34 for separation control of the tunnel electrodes 15, 16. Tunnel current between these electrodes is held constant by adjustment of electrode separation with an analog feedback control circuit 32. The prototype sensor structure is compact, approximately 6 cm $\times$ 4 cm $\times$ 2 cm. The active element of the device occupies about 0.1 cm$^3$. When the sensor structure experiences an acceleration the feedback circuit 32 applies a voltage to the piezoceramic actuator 34 to maintain constant electrode separation 14. Variation in the feedback voltage signal is simply proportional to the acceleration and serves also at the output signal of the sensor at terminal 31.

Since the feedback or servo signal at 31 and 38 is proportional to acceleration, a voltmeter or galvanometer 44, which may be of a ballistic type, may be employed for indicating acceleration acting on the object 12 or elastic beam 34. However, for these and other applications of tunnel effect sensors pursuant to the subject invention, the component 44 may be considered symbolic for any kind of suitable instrument, data recorder, oscilloscope, oscillograph or data processing facility or control system.

The force F need not be positive as shown, but may be negative, or may be a pull, such as during deceleration, or by pull of gravity, and the like. For instance, when the sensor 10 is turned 180° about its longitudinal axis 46, the force F, if gravitational, changes in direction, whereby the illustrated apparatus may serve as a position sensor.

In the case of a position sensor or a method of determining position of an object in space, the electric tunneling current 13 is again provided through a gap 14 between an electrode, such as the electrode 15, and the object in space. In practice, that object may be discrete or may be integrated with the beam 34 or with a membrane or other elastic suspension or medium.

A position of the object 12 in space may then be determined from the electric tunneling current 13, voltage across the gap 14, or other electrical property of that gap, such as with the aid of the servo system 32 or in any other suitable manner. That step may be performed in the laboratory or at a manufacturer, who may thus calibrate the instrument 10 in terms of position. Within the scope of the invention, the user of the position sensor may also perform that step, as desired or necessary.

In either case, the object 12 is thereafter changed in position to induce a variation in the gap 14 and in the electrical property thereof. By way of example, FIG. 1 indicates a change in position 45 about a longitudinal or other axis 46 of the position sensor 10. If the force of gravity acting on the object 12 is designated as F, and if the sensor is rotated about its axis 46 by the above mentioned 180°, then the force of gravity may be designated as −F, as shown in FIG. 1. Of course, the force of gravity does not become negative, but the force acting on the object after such a rotation may be considered negative in direction relative to the original force of gravity F. Since the force of gravity is now a pull on the object 12, the gap 14 is widened and the tunneling current, voltage or other electrical property is correspondingly varied. This is picked up by the instrument 44 as the feedback circuit or servo loop 32 reacts to such change. Accordingly, changed position of the object may be determined from a variation in the electrical property of the gap traversed by tunneling current 13 in this or any other suitable manner within the scope of the subject invention.

In this respect and in general, all the other features herein described for other kind of sensors may be employed for the position sensor and position sensing techniques as well.

It may be recognized that the position sensors herein disclosed present a special case of the gravitational and inertial sensors falling generically within the scope of the subject invention. To be sure, there was no intuitive reason why gravitational and inertial forces should be the same. However, pursuant to Einstein's principle of equivalence, the seemingly different situations of gravity and inertia are simply equated as being the same. It is thus rather a matter of convenience, whether in a particular situation a given observer considers to call forces he or she experiences inertial or gravitational.

In this sense, the position sensor herein disclosed is akin to the accelerometer, the particle detector, the wave energy sensor, the acoustic wave detector, the microphone, and so forth.

For instance, if in FIG. 1 particles 48 impinge upon the object 12 or beam 34, then inertial forces from such particles are imparted to the object or beam to vary the gap 14 and thereby the tunneling current 13.

For instance, inertial forces, such as the force F shown in FIG. 1, may be provided by impacting particles 48 on the object 12. The tunneling gap 14 may thus be varied with inertial forces acting on the object 12 from the impacting particles 48, and corresponding variations in an electrical property of the gap 14 traversed by the tunneling current 13 may be sensed and the thus imparted inertial forces may be determined or measured for a detection of the particles 48 from the latter corresponding variations, such as with the aid of the feedback circuit or servo loop 32 and instrument 44 or equivalent means.

In this manner, particle velocity, particle mass or another parameter of the particles 48 may be determined or measured from the mentioned corresponding variations in a predetermined electrical property of the gap 14.

As shown in FIG. 2, the particles 48 may impinge on the object at a grazing angle and may continue their travel as indicated at 148, after imparting to the object 112 part of their energy, for measurement with the corresponding variations in an electrical property of the gap.

By way of further alternative within the scope of the subject invention, FIG. 2 shows the provision of measurable inertial forces by impacting wave energy 51 on the object. Again, inertial forces in the wave energy 51 are transferred to the object which, accordingly, varies the gap 14 and thereby an electrical property thereof. The feedback circuit or servo loop 32, or any other suitable means, may then be employed for determining such inertial forces for detection of the wave energy 51 from corresponding variations in that electrical property. A parameter of the wave energy may thus be determined from these corresponding variations.

As a special case, inertial forces may be provided by impacting acoustic energy on the object. The gap 14 is then varied with such inertial forces acting on the object from the impacting acoustic energy. Corresponding variations in an electrical property of the gap may then be sensed, and the inertial forces determined for detection of the acoustic energy from these corresponding variations. In this or any equivalent manner, a parameter of the acoustic energy may be determined. In practice, a hypersensitive microphone may thus be provided and very weak acoustic signals may be detected or even measured in location, origin, direction, amplitude, frequency, etc.

In addition to what has already been mentioned, FIG. 2 shows further principles and embodiments within the scope of the subject invention.

For instance, FIG. 2 shows a beam 134 having an object 112 incorporated therein or integrated therewith. In principle, the beam 134 may be of the same structure as the beam 34 shown in FIG. 1. However, the elastic beam 134 may be as thin as the layer 42 shown in FIG. 1.

In that case, the beam 134 may be adjusted and repositioned in space by an agency other than piezoelectric forces. For instance, magnetic or electrostatic forces may be employed for that purpose.

FIG. 2 shows the beam 134 supported by a mesa 136 of a supporting structure 118. As indicated at 53, the beam 134 may be grounded through the supporting structure 118. Such beam may then be driven with the aid of a counterelectrode 54 which in this case would be electrically insulated from the structure 118 but mechanically supported thereby at a sufficiently small distance from the electrically conductive beam 134 to permit attraction of the beam by high-voltage potentials applied to the insulated counterelectrode 54 via terminal 38. That terminal, and the feedback circuit or servo loop 32 connected thereto may be the same as shown in FIG. 1 and described above in connection therewith. In principle, the tunneling tip 16 could be attached to a free end of the beam 134. Alternatively, the electrode 15 could be attached to such beam or the beam could act as a tunneling counterelectrode for the tunneling current 13.

Summarizing this disclosure, a preferred embodiment of the invention provides methods and apparatus for measuring a force acting on an object, such as the above mentioned object 12 or 112. This embodiment provides an elastic beam, such as the beam 134, for suspending the object 112 or any other object, and makes that elastic beam deflectable by an electrostatic feedback signal, such as with the aid of the counterelectrode 54. A tunneling tip 16, an electrode, such as the electrode 15 or the beam 134 itself, and a tunneling gap 14 are provided between that tunneling tip and that electrode. As shown in FIGS. 1 and 2, either the tunneling tip or the electrode is connected to the elastic beam 134. This may be expressed by saying that one of that tunneling tip and that electrode is connected to that elastic beam.

An electric tunneling current 13 is provided through the tunneling gap 14 between said tunneling tip 16 and the electrode 15 or 134. The elastic beam 134 is deflected with the force F, 48 or 51 to provide a variation in an electrical property of the gap 14 relating to the tunneling current 13.

That embodiment also provides a servo loop 32 responding to the mentioned variation in the electrical property, and derives the electrostatic feedback signal from that servo loop. That embodiment further restores the deflected beam 134 in position with that derived electrostatic feedback signal, and provides a servo loop output signal, such as at 31, indicative of the force F, 48, 51, etc., acting on the object.

According to the embodiment shown in FIG. 2, a second beam 234 is employed. That beam may be a duplicate of either the beam 34 shown in FIG. 1 or the beam 134 shown in FIG. 2. In the actual showing of FIG. 2, it is assumed that the beam 234 is a duplicate of the beam 34 shown in FIG. 1 and is driven in essentially the same manner. Also, the tunneling tip 16 is shown attached to a free end of the second beam 234, but it could alternatively be attached to a free end of the first beam 134 within the scope of the embodiment illustrated in FIG. 2.

Electric energy for the tunneling current 13 is supplied in any suitable manner. By way of example, FIG. 2 shows the constant voltage source 120 which supplies a current I through resistor R and supply lead 21. This time, the tunneling tip 16 is connected to the electric current supply lead 21 through a conductive layer 235 which is insulated from the beam 234 or from its conductive upper layer 41 (see FIG. 1).

An embodiment of the invention thus provides or has a constant voltage source 120 for the electric tunneling current 13, and responds with the servo loop 32 to a change in voltage caused by current from that source in response to each variation of the gap 14. Restoration of the position of the beam is effected in response to that change in voltage.

Alternatively, such as explained above in connection with FIG. 1, a constant current source 20 is provided for the electric tunneling current 13, and the response with the servo loop 30 is also to a change in voltage caused by current from that source in response to each variation of the gap 14. Restoration of the position of the beam is again effected in response to that change in voltage.

In this or any other manner, a tunneling current 13 is set up through the gap 14 between the tunneling tip 16 and the free end of the beam 134. Gravitational or inertial forces imparted to the beam 134 by impacting particles 48, wave energy or acoustic waves 51, or in any other manner, cause variation of the gap 14 and thereby of an electrical property of the gap 14 traversed by the tunneling current. Such imparted force or energy again manifests itself by variations of that electrical property and corresponding variations of the output voltage of the source 20 or of the voltage drop across the resistor R. Such voltage or voltage drop variations are picked up by the feedback circuits or servo loops 32 and 132 which correspond to the feedback circuit or servo loop shown and described in conjunction with FIG. 1. Instead of the variable reference voltage source 25, FIG. 2 shows corresponding adjustable reference voltage sources or other adjustable means 125 for its corresponding controls 32 and 132. In this respect, the second beam 234 may be employed for coarse adjustment via controllable servo loop 132. If that beam is of a piezoelectric type, the second servo loop 132 may drive that beam via a terminal 138 connected to the first conductive layer 41 shown in FIG. 1. It may be noted in this respect that the second conductive layer 42 is grounded via supporting structure 118.

In principle, inertial, gravitational or other force or energy measurements may be taken from either control 32 or 132, or from a combination thereof. However, FIG. 2 shows the measuring instrument 44 or equivalent means connected to the servo loop 32 via terminal 31 already shown in FIG. 1.

According to further embodiments of the invention, the elastic beam 34 or 134 may be composed of two or more elastic beam structures having either the tunneling tip 16 or its counterelectrode 15 located therebetween. This may be expressed by saying that one of the tunneling tip 16 and the electrode 15 is located between the two or more elastic beams.

Additionally, or alternatively, the beam may be structured as a folded beam. In extension of that embodiment of the invention, the elastic beam may be composed of a pair of folded beam structures having one of the tunneling tip 16 and the electrode 15 located therebetween.

Within the scope of the invention, the side view of the tunneling device may look the same as in FIG. 1 or 2, whether the beam 34 is one beam, composed of two or more beam structures, straight or folded. Accordingly, what is disclosed herein with respect to FIGS. 3 to 6 may also be applied to the embodiments of FIGS. 1 and 2.

Also within the scope of the invention, tunneling devices herein disclosed may be composed of micromachined silicon. The advantages to the development of sensor components in silicon include the use of single crystals as raw material, use of photolithography for precision patterning, use of batch processing techniques to reduce fabrication costs, and micromachining in the fabrication of the device.

Embodiments of the type shown in FIGS. 3 to 6 have been micromachined to produce centimeter-scale components with micron-scale precision. As in the embodiment of FIG. 2, relative position of the tunneling electrodes is controlled through use of electrostatic forces applied between the elements. Advantageously, the electrostatic actuator is insensitive to thermal drifts and immune to the problems of creep associated with piezoelectric actuators. Also the response of the electrostatic actuator is a function only of the geometry and mechanical properties of the device, whereas the response of piezoelectric actuators is also dependent on the characteristics of the material, which may not always be reproducible between devices or over time. Finally, the electrostatic actuator may be miniaturized more easily because the scaling laws are well known, and the fabrication is less complex than for the piezoelectric actuator. The devices herein disclosed can be modified for incorporation into a wide variety of sensors. Monolithic devices including sensor and control electronics are also feasible.

Figure 5:
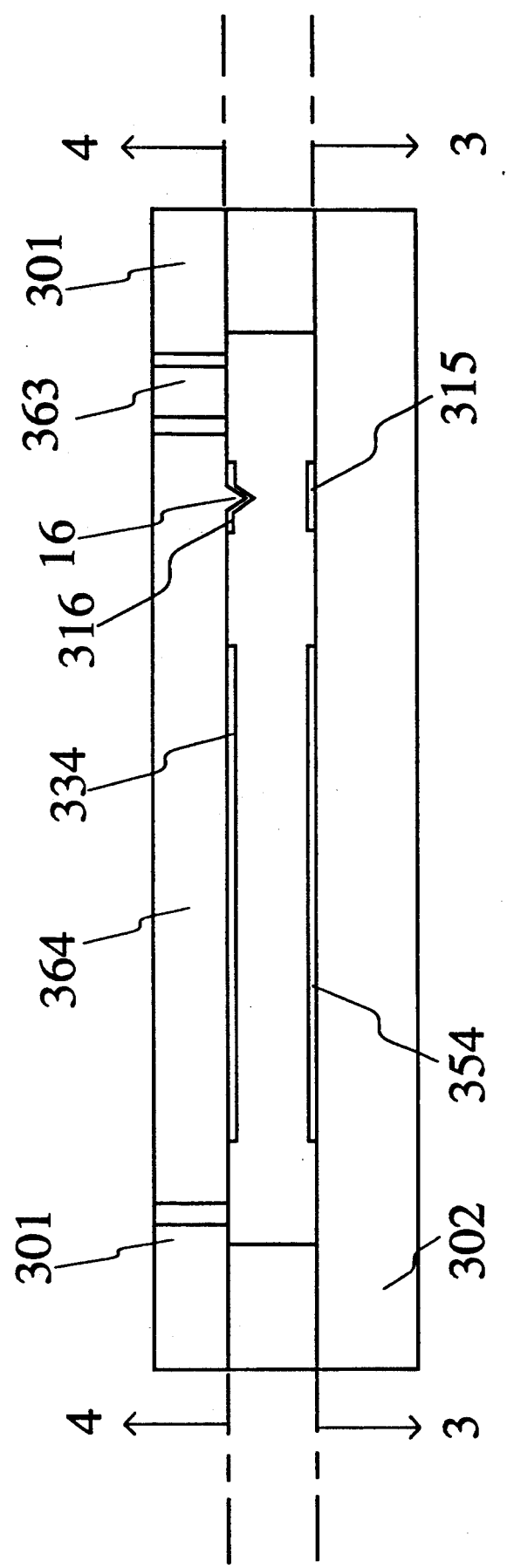
FIG. 5 is a side view section of a folded beam type tunneling sensor according to a further embodiment of the invention.

The tunnel sensor 300 according to FIGS. 3 to 5 comprise essentially two components, comprising a force-sensitive or deflectable structure 301 and a base 302 therefor. By way of example, these may be constructed from 200 micron silicon wafers. The wafers preferably are polished on both surfaces and are coated with a thin $SiO_2$ layer patterned by standard photolithographic techniques. The wafers may be etched in ethylene diamine pyrocatechol (EDP) to remove the parts of the silicon wafers not covered by the $SiO_2$ mask. After etching, the remaining oxide may be removed in a buffered HF etch. A new oxide layer, more than one micron thick, may be grown on all surfaces of the structure. Gold electrodes 315, 316, 334 and 354, with leads, such as 355 and 356, and contacts or terminals 338, 339, 350 and 351 may be thermally evaporated onto the components 301 and 302 of the sensor through shadow masks which may be fabricated by the same micromachining techniques. The $SiO_2$ serves as a dielectric isolation layer between the metal films and the silicon substrate.

The deflectable component 301 comprises two beam structures 361 and 362 having the tunneling gap 14 or tunneling tip 16 or electrode 316 located therebetween. According to the embodiment as illustrated specifically in FIG. 4, the beam structures are folded. In particular, each of the two beam structures 361 and 362 comprises a pair of folded beams. These two pairs of folded beams are interconnected by a cross-piece 363. Spaced from that cross-piece is an inner rectangular area 364 connected to the opposite ends of the inner beams of the folded beam pairs 361 and 362.

The inner rectangular area 364 of the folded cantilever spring structure can be deflected downward relative to the outer segments by application of an electric potential between the large electrode 334 and a corresponding counterelectrode 354 which is deposited on the base component 302 of the sensor. Given the mechanical properties of the silicon as well as the dimensions of the spring structure, the properties of the spring can be calculated. Because the spring constant scales rapidly with the dimensions of the legs 361, 362, its characteristics can easily be tailored to meet the needs of a specific application.

Various methods for manufacturing a suitable tunneling tip are available. We have formed silicon tips directly from the substrate by undercutting a 60×60 micron square of $SiO_2$ with EDP. When the undercutting is complete, the square fragment of oxide is carried away, leaving a pyramid-shaped silicon tip. The active surfaces of the tips may be prepared by evaporation of 3000-Å-thick Au films through a shadow mask. The tunnel sensor is then assembled as shown in FIG. 5.

By way of example, a bias voltage is applied to the electrostatic deflection electrodes 334 and 354 in the manner shown for the electrodes 134 and 154 in FIG. 2 to close the electrodes and establish a tunnel current 13. Active regulation of the tip-electrode separation using feedback control of the tunneling current may be carried out as in FIGS. 1 or 2. The second beam 234 may also be used in the embodiment of FIGS. 3 to 5.

The sensitivity of the tunneling sensor is several orders of magnitude better than conventional compact accelerometers. For comparison, the sensitivity of a compact capacitive displacement transducer may be calculated. It is assumed that the electrode separation is no less than 1/100 of the electrode length, that the voltage is no greater than the limit for dielectric breakdown in vacuum, and that sensitivity is limited by the shot noise at the AC measurement frequency of 1 kHz. With these assumptions, the capacitive transducer has a theoretically limited sensitivity to variations in electrode separation of approximately 0.2 A $Hz^{-\frac{1}{2}}$. In this limit, the theoretical capacitive transducer is three orders of magnitude less sensitive than our prototype tunneling transducer, and more than four orders of magnitude less sensitive than the theoretical limit to the tunneling transducer.

Since all of the components of our tunnel sensor can be prepared using standard lithographic techniques, miniaturization over several orders of magnitude can be readily achieved. This allows low-cost production of sensors of this type as transducers for application to a wide variety of measurement needs. For instance, miniature pressure sensors and microphones could be constructed with tunnel sensor technology.

Another embodiment of the invention is shown in FIG. 6 in the form of a tunneling magnetometer 400 having a base 401, a mesa 402, and a pair of cantilever beams 461 and 462 interconnected by a cross-piece 463. An electrically conductive loop 404 is deposited or otherwise provided on the beam structure, and extends from terminals 405 and 406 on the mesa 402 along beams 461 and 462 and their cross-piece 463.

From a broader aspect within the scope of the invention, methods and apparatus for measuring a magnetic field provide or include an electrically energizable loop 404, and make or render such electrically energizable loop deflectable by a magnetic field M when electrically energized, such as from a variable electric current source 408 via terminals 405 and 406.

A tunneling gap is again provided between a tunneling tip 16 and a counter electrode. Reference may in this respect be had to FIGS. 1, 2, 3, 4 and 5 for various ways to provide a tunneling gap 14 with tunneling tip and counter electrode between a beam 34, 134 or 364. Accordingly, only the tunneling tip 16 is shown in FIG. 6, and the corresponding counterelectrode on the lower side of the beam or cross-piece 463 is hidden from view in FIG. 6. Alternatively, the tunneling tip 16 may be attached to the lower side of the beam or cross-piece 463, in which case the electrode 415 on the base 401 acts as counterelectrode for the tunneling gap 14, such as seen in FIG. 1, for instance. Moreover, the second beam 234 shown in FIG. 2 may also be used in the embodiment of FIG. 6.

It is thus seen that the embodiment partially shown in FIG. 6 connects one of said tunneling tip 16 and its counterelectrode to the loop 404 to be moveable thereby or therewith, and electrically energizes that loop, such as with current from the source 408. An electric tunneling current 13 is provided through the tunneling gap 14 between the tunneling tip 16 and its counterelectrode.

That electrically energized loop 404 is deflected with the magnetic field M to provide a variation in an electrical property of the gap 14 relating to the tunneling current 13, such as described above in connection with FIGS. 1 and 2.

A measurement of the magnetic field M may then be provided in response to that variation in that electrical property of the tunneling gap 14. For instance, variations in the tunneling current 13 or in a voltage across the tunneling current 13 or in a voltage across the tunneling gap 14 or across a constant current source 20 or voltage drop resistor R in series with a constant voltage source 120 may be measured as a measure of the applied magnetic field M.

For a vector magnetometer, the direction of the magnetic field may be varied or three magnetometers 400 may be arranged along three orthogonal axes.

In the embodiment shown in FIG. 6, the tunneling tip or its counterelectrode is provided on an elastic beam 461, 462, 463 separate from the loop 404 itself. Nevertheless, the beam structure may be considered as part of the loop composed of two elastic beam structures 461 and 462 having interconnected free ends, such as via the cross-piece 463.

While not specifically shown in FIG. 6, the kind of servo loop responding to each variation in the electrical property of the tunneling gap 14 may also be provided in that embodiment. In that case, the gap is continually restored with that servo loop in response to each variation in its electrical property, and a servo loop output signal may then provide a measure of the magnetic field M. Additionally or alternatively, the tunneling tip 16 may be provided on a further beam 234 which may, for instance, be controlled as that beam in FIG. 2. The component 142 in FIG. 6 may thus be such a further beam.

Figure 7:
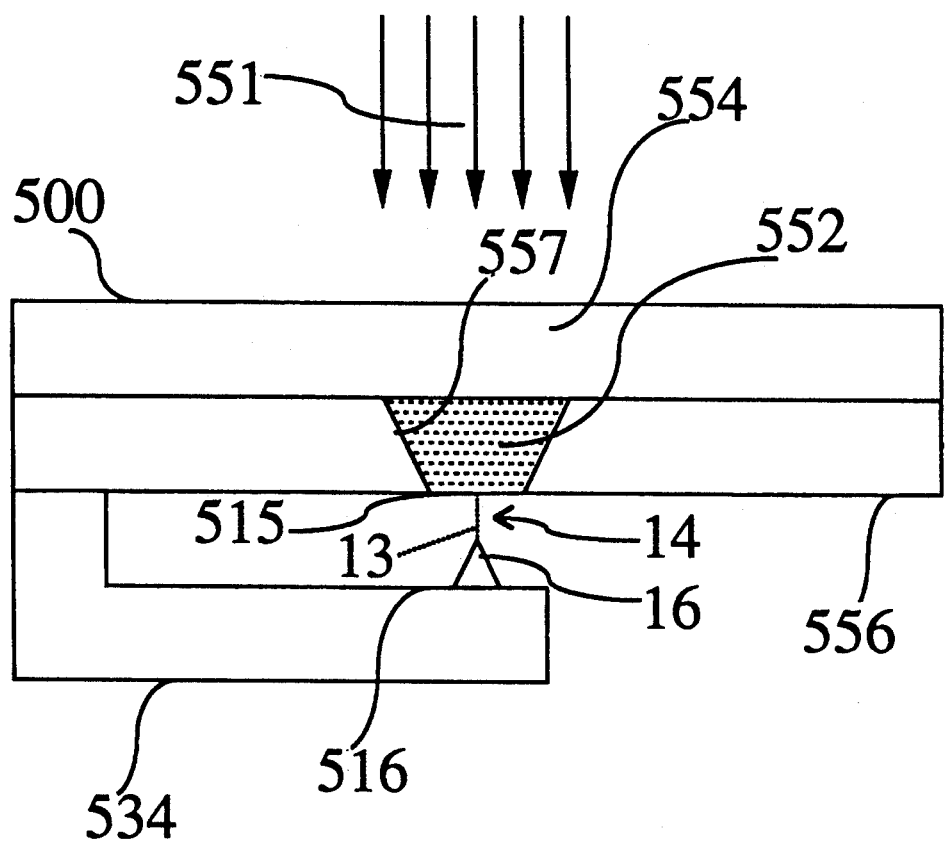
FIG. 7 is a somewhat diagrammatic side view of a radiation sensor or detector pursuant to an embodiment of the invention.

It may be recalled from FIG. 2 that detection and measurement of wave energy 51 is an object of an illustrated embodiment of the invention. FIG. 7 illustrates a related embodiment of the invention useable particularly when the wave energy is radiant energy. In this case, that wave energy may still be impacted on an object, and the tunneling gap 16 may be varied with inertial forces acting on that object from the impacting wave energy.

In FIG. 7, radiant energy 551 is in effect impacted on a fluid volume 552 or on one of the tunneling electrodes 515 via the medium 552.

The radiation 551 is capable of varying the fluid volume 552, as more fully disclosed below.

In the embodiment shown in FIG. 7, the fluid volume is entrapped with the aid of an elastic first electrode or membrane 515. A second electrode 516 is spaced from that first electrode 515. One of these first and second electrodes 515 and 516 is provided with a tunneling tip 16 spaced by a tunneling gap 14 from the other of these first and second electrodes.

An electric tunneling current 13 is again provided through that tunneling gap. By way of example, either the constant current source 20 as in FIG. 1, or the constant voltage source 120 as in FIG. 2 may be connected to the electrodes 515 and 516 for that purpose.

The entrapped fluid volume 552 is then varied with the radiation 551 to displace the elastic first electrode 551, and a corresponding variation in an electrical property of the gap 14 relating to the tunneling current 13 is sensed, such as by sensing variations in the tunneling current or in a voltage across the tunneling gap 14, across a constant current source 20 or across a resistor R in series with a constant voltage source 120, as disclosed above. A parameter of the radiation 551 may then be determined from that variation in the electrical property of the tunneling gap 13.

If the radiation 551 is infrared radiation, the fluid volume 552 may also be entrapped with the aid of a window for such infrared radiation, and that infrared radiation 551 is then applied through that window to the entrapped fluid volume 552 to vary that entrapped fluid volume and displace the elastic first electrode 515 as disclosed above for the variation of the tunneling current or voltage as disclosed above. A parameter of the infrared radiation may thus be detected and measured. By way of example, the fluid 552 may be air or another gas that changes its volume in response to infrared radiation. In the case of radiation in general, the fluid 552 is a gas or liquid that changes its volume in response to that radiation.

As in the case of the embodiments of FIGS. 3 to 6, the radiation detector 500 of FIG. 7 may be micromachined and otherwise manufactured from silicon, as disclosed above. The membrane 515 may, for instance, be fabricated by deposition of stress-free silicon oxynitride on one surface of a wafer 556. A cavity 557 is etched into that wafer and the fluid 552 is entrapped therein with the aid of window 554.

Figure 8:
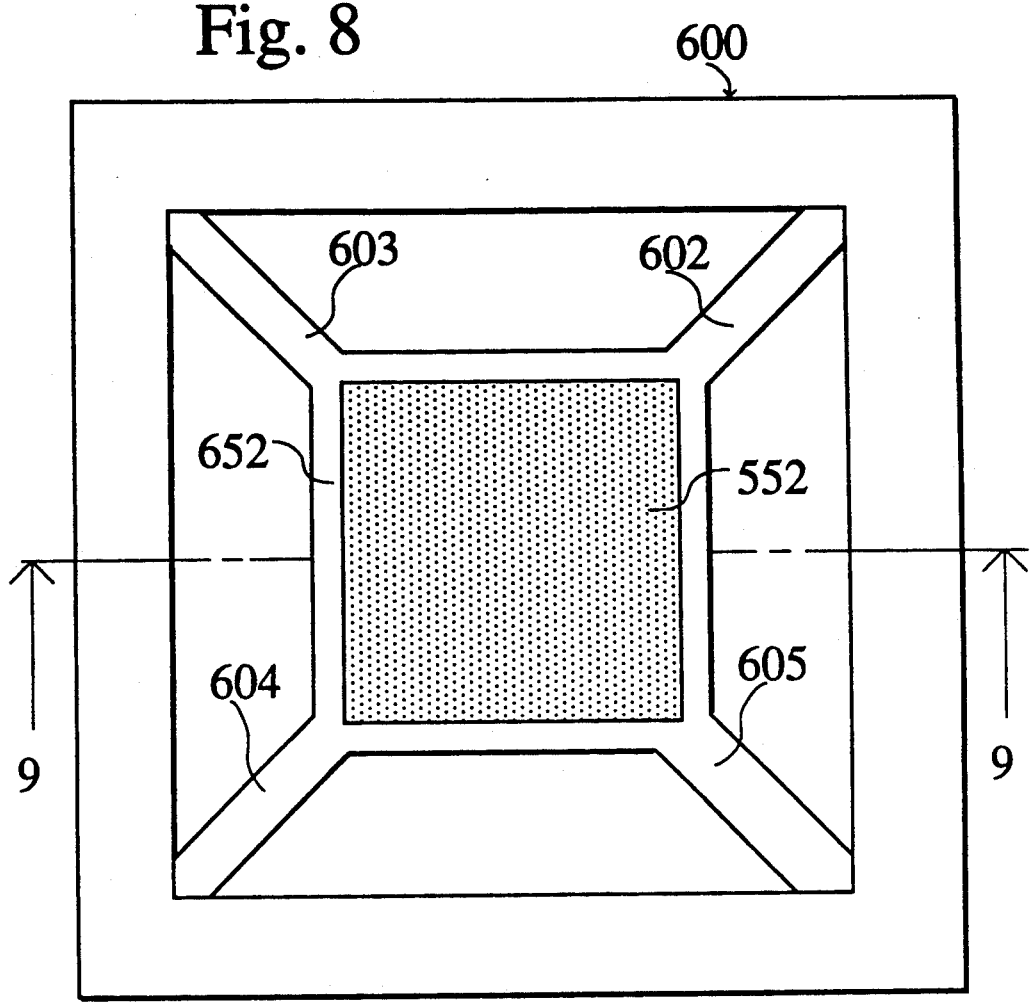
FIG. 8 is a top view of a radiation sensor or detector pursuant to a preferred embodiment of the invention.
Figure 9:
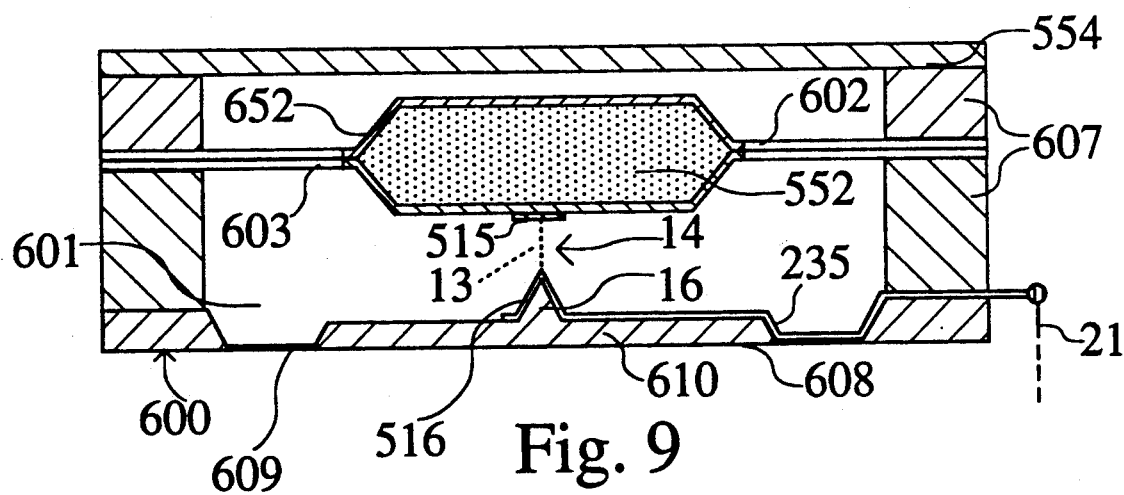
FIG. 9 is a section taken on the line 9—9 in FIG. 8.

The first electrode 515 need not necessarily entrap the fluid volume 552 and need not necessarily be elastic, but it needs to be in force-transfer relationship with the entrapped fluid volume. By way of example, FIGS. 8 and 9 show another radiation sensor according to a preferred embodiment of the invention. The radiation 551 may be the same as in FIG. 7 and is thus not shown in FIGS. 8 and 9.

According to FIGS. 8 and 9 the fluid volume 552 is entrapped in a bubble 652, which may, for instance, be made of silicon nitride or a variety of other suitable materials. The bubble with entrapped fluid volume 552 is suspended in a space 601, such as with four narrow legs or ribbons 602, 603, 604 and 605 minimizing heat transfer away from the bubble 652. The space 601 preferably is evacuated for minimizing heat loss.

The first electrode 515 is provided in force-transfer relationship with the entrapped fluid volume 552 through the bubble 652 or bubble wall.

The first electrode 515 is displaced by varying a shape of the bubble 652 with the radiation 551.

FIG. 9 shows the bubble 652 and entrapped fluid volume 552 symmetrical relative to a horizontal plane through the legs 602 to 605, and relative to a vertical plane through the tunneling tip 16. However, asymmetrical bubble and entrapped fluid arrangements are within the scope of the invention.

For example, the upper half of the bubble could be made stronger than the lower half, whereby more energy would be directed by the varying fluid volume to the tunneling gap.

The bubble 652 and tunneling gap 14 may be housed in a preferably evacuated enclosure 607 having, for instance, an infrared or other radiation window 554 on a top thereof and a base or bottom 608 at a lower part thereof. That bottom may have weakened or flexible sections 609 around a central section 610.

The electrodes 515 and 516 may be connected and energized as in FIGS. 1 or 2, for example. Not all energizing or ground leads are shown in FIGS. 7 to 9, since they are obvious as such once the principle of the invention is understood. However, FIG. 9 does show a current conducting lead 235 connecting the tunneling gap 14 to an energizing lead, as in FIGS. 1 and 2, for example.

The radiation detector 600 also may be micromachined and manufactured from silicon, as disclosed above.

While not specifically shown in FIGS. 7 to 9, the kind of servo loop responding to each variation in the electrical property of the tunneling gap 14 may also be provided in that embodiment. In that case, the gap is continually restored with that servo loop in response to each variation in its electrical property, and a servo loop output signal may then provide a measure of the infrared or other radiation. Additionally or alternatively, the tunneling tip 16 may be provided on a further beam which may, for instance, be similar and be controlled as that beam in FIG. 2. The component 534 in FIG. 7 and/or 610 in FIG. 9 may thus be such a further beam.

By way of further example, piezoelectric or the electrostatic feedback and servo systems disclosed in connection with FIGS. 1 to 5 may also be provided or employed in the embodiments of FIGS. 7 to 9. In that case, an electrostatic electrode 334 (see FIGS. 4 and 5) may be provided at the tunneling electrode 515 or on the bubble 652, while an electrostatic counterelectrode for the servo system may be provided at the tunneling electrode 516 or enclosure part or central section 610.

The force applied to the object or beam may be modulated such that the position of the object or beam is modulated. This produces a modulation in the tunnel gap electrical properties. By comparing the force modulation amplitude with the modulation amplitude of said electrical properties, a calibration of sensor sensitivity may be directly obtained.

In practice, this modulation may be effected in the feedback loop and may be applied to the beams of FIGS. 1 to 5, to the electrically energized loop of FIG. 6, to the electrode 515 of FIG. 7 or to the bubble of FIGS. 8 and 9. By way of example, a modulation of the electric tunneling current 13 may be observed as the modulation of said electrical properties.

An outstanding feature of this embodiment is that its performance is capable of reaching the fundamental limit. By way of background, a typical thermal detector has a temperature coefficient on order of 1 K.$^{-1}$ or smaller. For the radiation detectors herein disclosed, the combination of a relatively large thermal expansion of gasses at room temperature and the extreme sensitivity of the tunnel transducer leads to a temperature coefficient as high as $10^4$ K.$^{-1}$. This large temperature coefficient plays an important role in reducing the contribution from several noise sources to the sensitivity. In particular, the contribution to the noise equivalent power (NEP) of the detector from shot noise in the transducer is as follows:

$$(NEP_{Shot})^2 = \frac{2Ie}{S^2} = \frac{2e(G^2 + (C)^2)}{I\alpha^2} \quad (1)$$

wherein: I is the tunneling current 13, e is charge of the electron, S is responsivity of the sensor in amperes per watt (W), G is the thermal conductance away from the fluid volume 552, C is the heat capacity of that fluid volume, $\omega$ is the radiation signal frequency, and $\alpha$ is the temperature coefficient. The appearance of $\alpha$ in the denominator reduces the contribution of this noise source.

In this respect, a well-known indicator of performance is the ratio of the square root of the area of fluid volume 552 and the above mentioned noise equivalent power (NEP). The ratio is known as Detectivity (D*). Embodiments of the invention provide Detectivities on the order of $10^{10}$ cmHz$^{\frac{1}{2}}$/W (area=1 mm$^2$, temperature=300 K., chopping frequencies from 10 Hz–10 kHz, infrared wavelengths from 1 mm to 2 $\mu$m). This performance meets or exceeds that of all other mid-to-far infrared radiation detectors which operate at room temperature.

The new uses of electron tunneling according to the subject invention provide an entirely new class of sensors for acceleration or wave or radiant energy or magnetic field measurement, particle detection and other responses or reactions to gravitational or inertial forces in space or various physical quantities. Preferred embodiments of the invention are characterized by order of magnitude improvements in sensor performance, low power consumption, and reduction of device size relative to existing sensor technology, and increased ease and efficiency of manufacture.

Moreover, the subject extensive disclosure will render apparent or suggest to those skilled in the art numerous substitutions, modifications and alterations within the spirit and scope of the subject invention.

We claim:

1. Apparatus for measuring a magnetic field, comprising in combination:
   an electrically energizable loop;
   means for rendering said electrically energizable loop deflectable by said magnetic field when electrically energized;
   a tunneling gap between a tunneling tip and an electrode, one of said tunneling tip and said electrode connected to said loop;
   means for electrically energizing said loop;
   means for providing an electric tunneling current through said tunneling gap between said tunneling tip and said electrode;
   means for varying an electrical property of said gap relating to said tunneling current in response to deflection of said electrically energized loop with said magnetic field; and
   means for providing a measurement of said magnetic field in response to said variation in said electrical property.

2. Apparatus as in claim 1, including:
   an elastic beam, said tunneling tip located on said elastic beam.

3. Apparatus as in claim 1, wherein:
   said loop includes two elastic beam structures having interconnected free ends.

4. Apparatus as claimed in claim 1, including:
   means including a servo loop responding to each variation in said electrical property;
   means connected to said servo loop for continually restoring said gap with said servo loop in response to each variation in said electrical property; and
   means connected to said servo loop for providing a servo loop output signal for said measurement of the magnetic field.

5. Apparatus as claimed in claim 4, including:
   a constant current source for said electric tunneling current;
   said means including a servo loop include means for responding with said servo loop to a change in electric tunneling current from said source in response to each variation of said gap; and said means for continuously restoring said gap include means for effecting restoration of said gap in response to said change in electric tunneling current.

6. Apparatus as claim in claim 4, including:

a constant voltage source for said electric tunneling current;

said means including a servo loop include means for responding with said servo loop to a change in electric tunneling current from said source in response to each variation of said gap; and said means for continuously restoring said gap include means for effecting restoration of said gap in response to said change in electric tunneling current.

7. A method of measuring a magnetic field, comprising in combination the steps of:

providing an electrically energizable loop;

making said electrically energizable loop deflectable by said magnetic field when electrically energized;

providing a tunneling gap between a tunneling tip and an electrode;

connecting one of said tunneling tip and said electrode to said loop;

electrically energizing said loop;

providing an electric tunneling current through said tunneling gap between said tunneling tip and said electrode;

deflecting said electrically energized loop with said magnetic field to provide a variation in an electrical property of said gap relating to said tunneling current; and providing a measurement of said magnetic field in response to said variation in said electrical property.

8. A method as in claim 7, wherein:

said tunneling tip is provided on an elastic beam separate from said loop.

9. A method as in claim 7, wherein:

said loop is composed of two elastic beam structures having interconnected free ends.

10. A method as claimed in claim 7, including the steps of:

providing a servo loop responding to each variation in said electrical property;

continually restoring said gap with said servo loop in response to each variation in said electrical property; and providing a servo loop output signal for said measurement of the magnetic field.

11. A method as claimed in claim 10, including the steps of:

providing a constant current source for said electric tunneling current;

responding with said servo loop to a change in electric tunneling current from said source in response to each variation of said gap; and effecting restoration of said gap in response to said change in electric tunneling current.

12. A method as claimed in claim 10, including the steps of:

providing a constant voltage source for said electric tunneling current;

responding with said servo loop to a change in electric tunneling current from said source in response to each variation of said gap;

effecting restoration of said gap in response to said change in electric tunneling current; and providing a servo loop output signal indicative of changes in position varying said gap.

* * * * *